June 24, 1941.  J. L. SNIDOW  2,247,319
ILLUMINATING MIRROR
Filed April 20, 1938  2 Sheets-Sheet 1
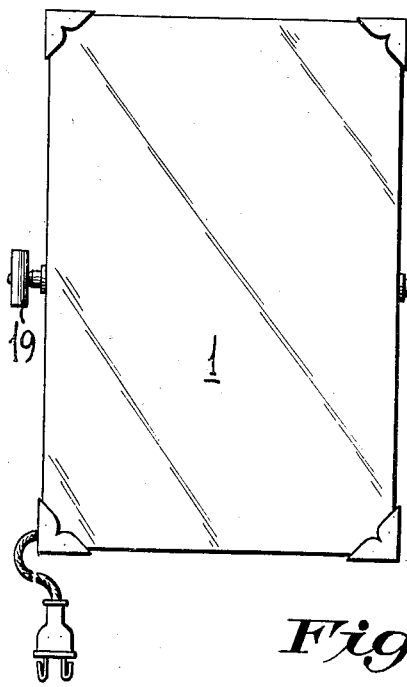
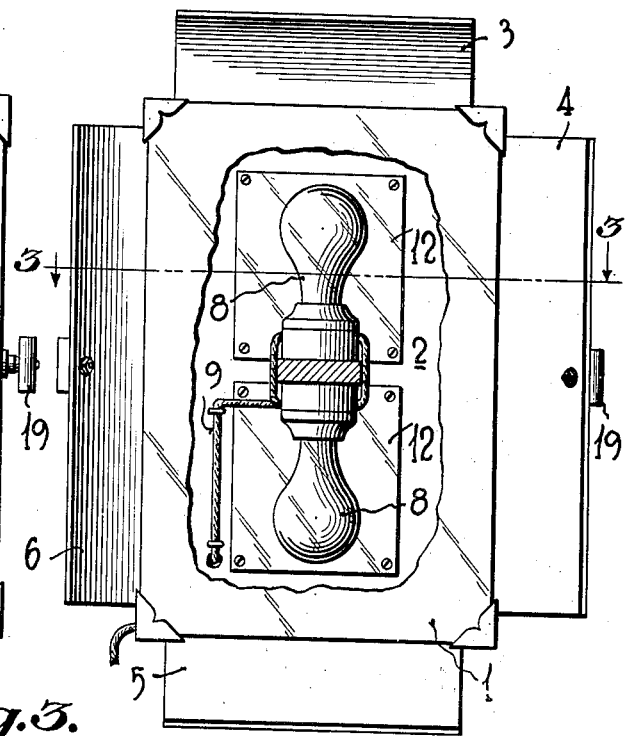
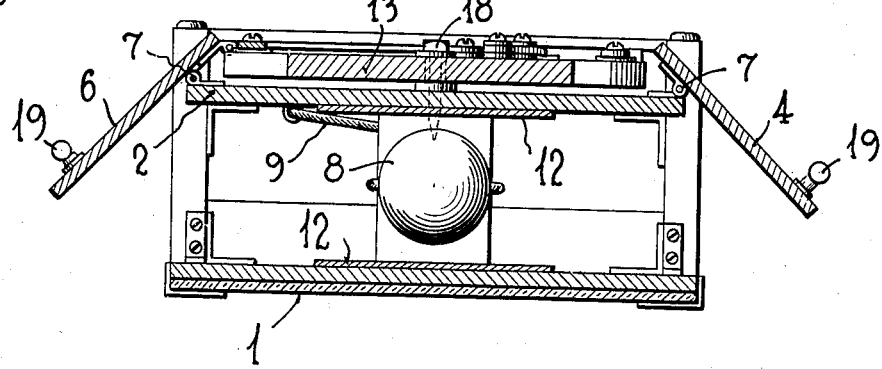

June 24, 1941.  J. L. SNIDOW  2,247,319
ILLUMINATING MIRROR
Filed April 20, 1938  2 Sheets-Sheet 2

Patented June 24, 1941

2,247,319

UNITED STATES PATENT OFFICE 2,247,319

ILLUMINATING MIRROR

John Louis Snidow, Lynchburg, Va.

Application April 20, 1938, Serial No. 203,162

2 Claims. (Cl. 240—4.2)

This invention relates to certain improvements in illuminating mirrors and particularly to that type wherein artificial light placed behind the mirror is reflected onto the object or person facing the mirror.

This principle broadly is not new, but the present invention is directed to certain novel improvements in connection with mirrors of this general type and has for its object the provision of a particular construction of cabinet whereby the artificial light is reflected from all four sides of the cabinet onto the object, said arrangement thus avoiding shadows and dark spots and resulting in a complete and perfect reflected object.

Another object of the invention is to provide a construction whereby the angle of reflection can be adjusted in accordance with the position of the object relative to the distance between the object and the mirror.

Another object of the invention resides in the construction of cabinet, wherein all four sides of said cabinet comprise reflectors for the sources of light located within the cabinet, back of the mirror, it to be understood that the mirror forms the entire front of the cabinet.

A further object is the provision of a device of the character described in which the four reflectors or sides of the cabinet are inter-connected for simultaneous operation.

A still further object is to provide an electric switch device positioned and arranged with respect to the interconnected parts of the adjustable sides of the cabinet, so that an electric circuit will be automatically established between the lights and source of current when the sides of the cabinet are opened, and conversely the circuit broken when the said sides are moved to closed position.

The preferring embodiment of the invention is illustrated in the accompanying drawings in which:

Figure 1 is a front elevational view of the cabinet.

Figure 2 is a like view with the sides of the cabinet extended and the mirror broken away to more clearly illustrate the position of the source of light.

Figure 3 is a sectional view partly in plan on line 3—3 of Figure 2.

Figure 5:
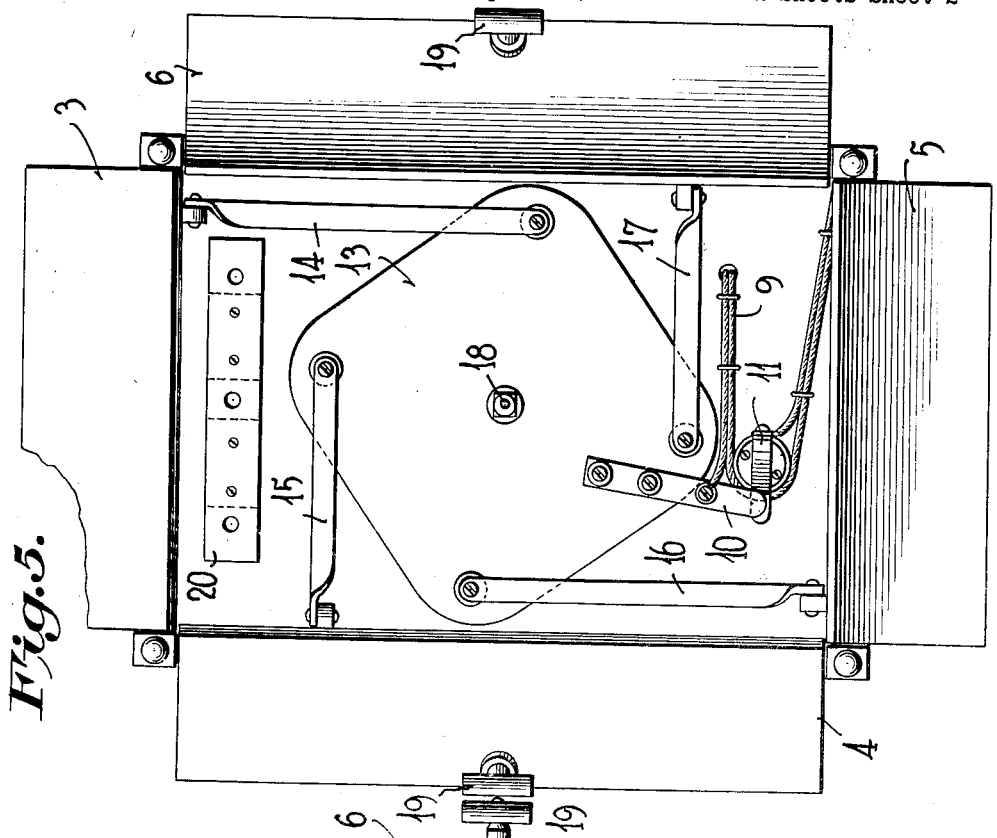
Figure 5 is a similar view with the sides extended and the electric switch in closed position.

Referring to the drawings in detail and particularly to Figures 2 and 3, the improved device comprises a box like structure consisting of a mirror 1 forming the entire front of said device when in operative position, a back portion 2 and four side portions 3, 4, 5, and 6, said side portions being secured to the back portion 2 by hinges or the like 7.

Mounted within the box structure are preferably two electric lamps 8 provided with the necessary wiring 9 extending out through the back 2 of the cabinet, one side of said line being connected to a movable contact 10 of a switch device (Fig. 4) and the other side running to a plug-in device (not shown) of the ordinary house type, the other wire from the said plug-in device being connected to the stationary part 11 of said switch device, all of which wiring being conventional.

Arranged in front of and in rear of each lamp 8 is a stationary reflector 12 and the inner faces of the hinged sides 3, 4, 5 and 6 are each also provided with reflectors or may be simply painted white to accomplish the same purpose.

Figure 4:
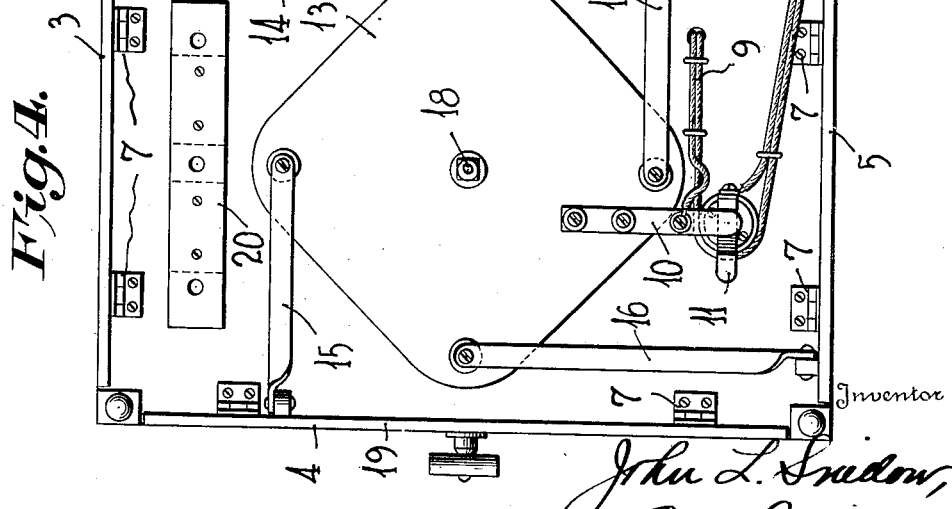
Figure 4 is a rear view of the cabinet in closed position with the electric switch in open position.

Referring more particularly to Figs. 4 and 5, the hinged side members 3, 4, 5 and 6 are connected to a rotatable plate 13 by links or the like 14, 15, 16 and 17, respectively, said rotatable plate 13 being positioned by a pivot pin or bolt 18. It will be noted that the movable contact member 10 of the electric switch device is secured to said plate 13 and movable therewith.

Two of the hinged side members, and preferably 4 and 5 are each provided with operating handles 19.

When the cabinet is positioned on the wall by grasping handles 19 and pulling outwardly all four of the hinged side members 3, 4, 5 and 6, may be extended to any desired angle, this being accomplished by reason of the interconnected rotary plate 13 and the connecting links 14, 15, 16, and 17, as clearly shown in Figs. 4 and 5.

At the same time an electrical contact to the lamps 8 will be established between the movable contact member 10 and stationary contact 11 of the switch device also clearly shown in Figs. 4 and 5, and thus providing the necessary light for the reflected illumination when the cabinet is in operative position.

What I claim is—

1. A light reflecting cabinet consisting of a front portion comprising a mirror, a back portion and side, top and bottom reflector portions hinged to said back portion, an electric lamp mounted within said cabinet and supported by the back portion, a switch device for said lamp comprising a movable part and a stationary part, said stationary part being mounted on the back of said cabinet, a rotatable plate also mounted in the back of said cabinet, said plate carrying the movable part of said switch device, links connecting each hinged side, top and bottom portion to said plate, whereby upon the opening of any one of said hinged portions said plate will be rotated and all of the hinged portions will automatically open and the switch device will be automatically closed to light said lamp.

2. A light reflecting cabinet consisting of a front portion comprising a mirror, a back portion and side, top, and bottom mirror portions hinged to said back portions, an electric lamp mounted within said cabinet and supported by the back portion, a switch device for said lamp comprising a movable part and a stationary part, said stationary part being mounted on the back of said cabinet, a rotatable member also mounted in the back of said cabinet, said member carrying the movable part of said switch device, links connecting each hinged side, top and bottom portion to said member, whereby upon the opening of any one of said hinged portions said member will be rotated and all of the hinged portions will automatically open and the switch device will be automatically closed to light said lamp.

JOHN LOUIS SNIDOW.